United States Patent [19]

Mess

[11] 3,943,817
[45] Mar. 16, 1976

[54] SPLIT BOLT
[75] Inventor: Richard C. Mess, Washington Township, Montgomery County, Ohio
[73] Assignee: The Dayton Sure-Grip & Shore Company, Miamisburg, Ohio
[22] Filed: Nov. 25, 1974
[21] Appl. No.: 526,583

[52] U.S. Cl. .......................... 85/1 S; 85/84; 85/87
[51] Int. Cl.² F16B 35/02; F16B 13/10; B66F 11/00
[58] Field of Search ............ 85/1 S, 5 E, 78, 79, 81, 85/82, 83, 84, 85, 86, 87, 88, 23; 151/31

[56] References Cited
UNITED STATES PATENTS

| 1,158,293 | 10/1915 | Roberts et al. | 85/23 |
| 1,957,770 | 5/1934 | Freeze | 85/86 |
| 2,327,038 | 8/1943 | Haseltine | 85/1 S |
| 2,693,732 | 11/1954 | Durst | 85/1 S |
| 2,892,376 | 6/1959 | Schonfeld | 85/86 |
| 3,373,649 | 3/1968 | Taylor | 85/87 |
| 3,456,547 | 7/1969 | Strong | 85/1 S |
| 3,472,111 | 10/1969 | Ono | 85/87 |

FOREIGN PATENTS OR APPLICATIONS

| 251,258 | 12/1966 | Austria | 85/84 |
| 857,371 | 12/1960 | United Kingdom | 85/84 |
| 861,685 | 2/1961 | United Kingdom | 85/86 |
| 1,154,574 | 6/1969 | United Kingdom | 85/87 |

Primary Examiner—Marion Parsons, Jr.
Attorney, Agent, or Firm—Biebel, French & Bugg

[57] ABSTRACT

The split bolt comprises plural bolt segments having threaded outer surfaces which are brought radially together to render the bolt insertable into a complementary threaded recess, and spaced radially apart to cause the bolt threads to become engaged when an elongated, generally cylindrically shaped wedge member is inserted between the segments to space them into the threaded engagement. The wedge member has plural camming surfaces along the length thereof which engage corresponding camming surfaces on the inside surfaces of the bolt segments. Further, the bolt segments are interconnected by an elastic means which surrounds the segments and keeps them in surface contact with the wedge member inserted therebetween.

9 Claims, 10 Drawing Figures

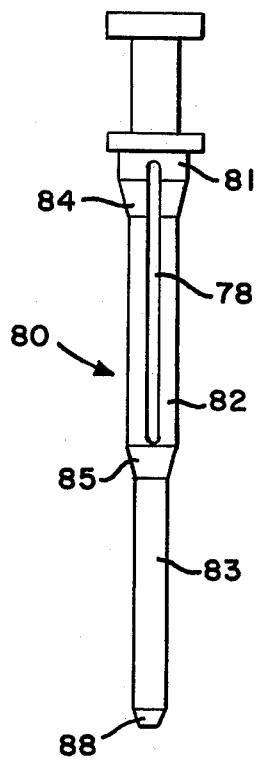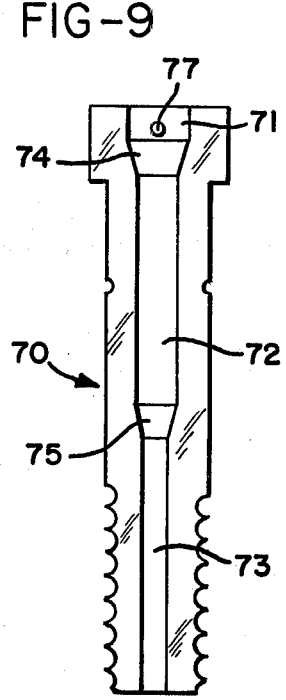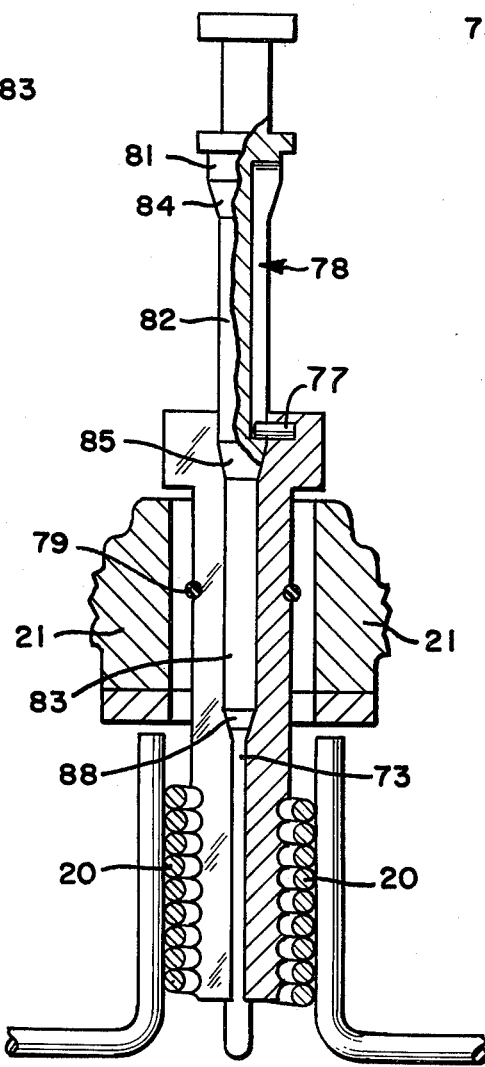

SPLIT BOLT

BACKGROUND OF THE INVENTION

The present invention relates to an improved split bolt for use in combination with an insert embedded in a concrete slab to provide for the attachment to the slab of a detachable means for lifting the object. Further, it is related to and an improvement over U. S. patent application Ser. No. 427,781, filed Dec. 26, 1973 and entitled "Split Bolt."

In recent years, there has come into rather wide usage a form of building construction referred to as the tilt-up slab method wherein large concrete slabs are cast on the floor or the building or on a level ground surface, and then lifted to a vertical position and interconnected to form the walls of the building. The means used for lifting the slabs must be removable after the slabs have been lifted into place to present a smooth surface on the walls of the building. Generally, the lifting attachments are installed and removed at the building site. Therefore, they should be easily and rapidly installed and removed in order to save maximum time.

One practice to embed a nut member or insert in the concrete slab and then to attach a lifting eye to the slab by passing a bolt through the eye and threading it into the nut member or insert. While this provides a satisfactory anchoring for the lifting eye, it requires threading the bolt into the insert, which, because of small particles of concrete on the thread surfaces, may require the use of a wrench to thread the bolt into the insert. The result is an increase in the time required to erect the walls. Additional time is expended when a wrench is required to remove the bolt.

U. S. Pat. No. 3,456,547 solves some of the above problems by providing a bolt means which is rapidly inserted in a nut means or insert and requires only a partial revolution to lock the bolt securely in place. The bolt means is formed from a pair of separate longitudinal cylindrical segments such as are formed when a conventional bolt is split along its longitudinal axis into two bolt halves. A portion of the bolt along the longitudinal axis is removed so that when the two segments are placed together, they may be easily inserted into the nut means.

After the two bolt segments are inserted in the nut means, a key member or wedge is positioned between the bolt segments to separate them into engagement with the female threads on the nut means. To remove the bolt, the key is withdrawn and the two segments of the bolt are brought together. This disengaes the threaded surfaces and permits withdrawal of the bolt.

The split bolt disclosed in U. S. Pat. No. 3,456,547 is highly effective, but it has a disadvantage in that the wedge, or "key" as it is referred to in the patent, is not readily removed once the bolt is in use. After the slab is lifted and installed, the wedge must be extracted from between the bolt segments in order to remove the bolt. Tab or ear means are disclosed in U.S. Pat. No. 3,456,547 for gripping and lifting the wedge, but the forces of installing and securing the bolt, as well as lifting and transporting the object, frequently cause the "key" to become tightly gripped or wedged between the bolt portions, and therefore difficult to remove. Further, the key or wedge is relatively thin, as compared to its width, and is easily bent, resulting in further inconvenience by its being rendered unusable or requiring time to straighten it out so that it will slide between the bolt segments.

The split-bolt of U.S. patent application Ser. No. 427,781, is basically similar to that of U.S. Pat. No. 3,456,547 in that it has a similar type wedge. It improves upon the split-bolt of U.S. Pat. No. 3,456,547 because it has a further means to extract the wedge from between the bolt portions as well as a wedge shaped tip to cause the bolt segments to be spaced or wedged apart. But the split-bolt of Ser. No. 427,781 can still suffer from the inconvenience of the wedge member becoming bent.

A need therefore exists for an improved split-bolt which can be quickly, simply and efficiently inserted in and extracted from, e.g., a coil insert, while being durable enough that the wedge member will not become readily bent such as to render the split-bolt inoperative.

SUMMARY OF THE INVENTION

The invention is an improved split bolt for use in combination with an embedded anchoring means for detachably securing a lifting means to concrete slabs of the like.

Broadly, the improved split bolt comprises plural bolt segments which are radially brought together, i.e., collapsed, to render the bolt readily insertable into a complementary threaded recess and radially spaced apart, i.e., expanded, to cause the outer, threaded surfaces of the bolt segments to become engaged threadably, and an elongated, generally cylindrically shaped wedge member insertable between the segments to space them into the threaded engagement.

The wedge member is preferably a stepped shaft or rod comprising a body portion of a series of integral, generally cylindrical sections of decreasing cross-sectional diameter having smooth frusto-conical transistions or steps therebetween. The arrangement of the steps or camming or wedging surfaces along the outer surface of the body portion of the wedge member results in a wedge which is stronger than those employed in the prior art split bolts heretofore described. The wedge member has a head at its largest (diameter) end and a cylindrical collar means which is located between the head end and the body portion, and which will restrict or limit the extent to which the wedge member can be inserted between the wedge segments.

The head of this wedge member is basically a cylindrical extension above the collar topped by a larger, cylindrical boss. When the wedge member is to be inserted, the boss on the head end can be struck with, e.g., a hammer, to cause the wedge member to move longitudinally and to be inserted between the bolt segments without fear of damaging the wedge member by bending it. The boss also provides a convenient means for grasping the wedge member when it is to be withdrawn from between the segments so that the segments can be brought together, i.e., to collapse the bolt, so that the split bolt can be removed.

The bolt segments preferably are such that together they describe a hollow, generally cylindrical interior or bore of decreasing cross-sectional diameter, which basically comprises a series of integral cylindrical openings or sections having frusto-conical transitions or steps from one section to another which correspond to the steps on the wedge or wedge member. When the wedge is inserted, the wedge steps will cam or wedge against the segment steps and cause the segments to be spaced apart radially, thus opening or expanding the bolt.

By interconnecting the bolt segments with an elastic member, preferably an elastic O-ring which surrounds the segments and which can be seated in a groove in the exterior surface of the segments, the segments will be held in an assembled relationship. When the wedge is inserted between the segments, the elastic member will expand radially, becoming larger in diameter, due to the outward radial force exerted by the wedge. When the wedge is withdrawn, the elastic member will exert an inward force on the segments due to the energy stored when it was expanded, causing the segments to move radially inward and toward one another. Thus the bolt will collapse essentially automatically.

The wedge points, i.e., the steps, are located along the body of the wedge member, as compared to being located at the tip of the wedge member as in the case of the heretofore mentioned prior art split bolts. This results in a body portion which is stronger, and so the wedge member of the present invention is less susceptible to bending. With the prior art wedge member, the force to space the bolt segments apart was generated at the tip end of the wedge member by an insertion force applied at the head end of the wedge member. Thus, the forces at each end of the wedge member consisted of an upward force due to the resistance of the segments to expand and a downward force due to the insertion motion at the head end. The whole length of the wedge was in compression, and so was susceptible to bending.

With the wedge members of the present invention, the resistance to expansion of the bolt segments occurs along the length of the wedge member as well as at the tip. There is less length along which the bending forces can act, and the plural camming points mean that there is less resistance at each point. Further, since part of the wedge member will be inserted between the segments before the wedging or camming surfaces will contact and generate an opposing force, there is guiding action which insures that the wedge member is aligned for insertion between the segments.

In the preferred embodiment, there will be three bolt segments, which are formed basically by drilling out the core to form the center bore. By using a step drill, the wedge or camming surfaces can also be formed. Once the center bore is formed the bolt is simply sawed into three segments. This a simpler and less expensive manufacturing process than is used to make the aforementioned prior art split bolts which require a more expensive cutting step to form the sloped interior surfaces of the segments.

It is therefore an object of the invention to provide an improved split bolt which is relatively simple, inexpensive, and durable, and further can be quickly and efficiently inserted and removed without the wedge member becoming bent or the like.

Other objects invention advantages of the invention will be apparent from the following description, the accompanying drawings and the appended claims.

BRIEF DESCRIPTION OF THE DRAWINGS

In the drawings:

FIG. 8 is an elevational view of a second embodiment of a wedge member for use in the split bolt of the invention;

FIG. 9 is an elevational view of a second embodiment of a bolt segment for use in the split bolt of the invention; and FIG. 10 is a view similar to FIG. 6 of an improved split bolt incorporating the wedge member and bolt segments shown in FIGS. 8 and 9.

DESCRIPTION OF THE PREFERRED EMBODIMENTS

Figure 1:
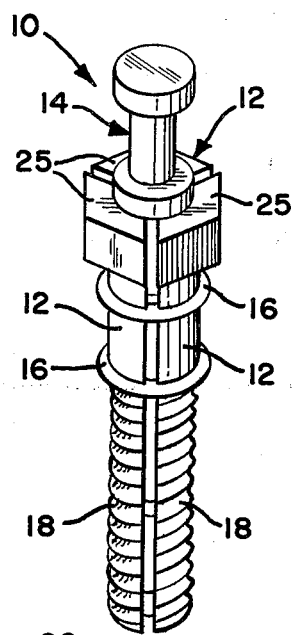
FIG. 1 is a perspective view of an improved split bolt in accordance with the teachings of the invention.
Figure 2:
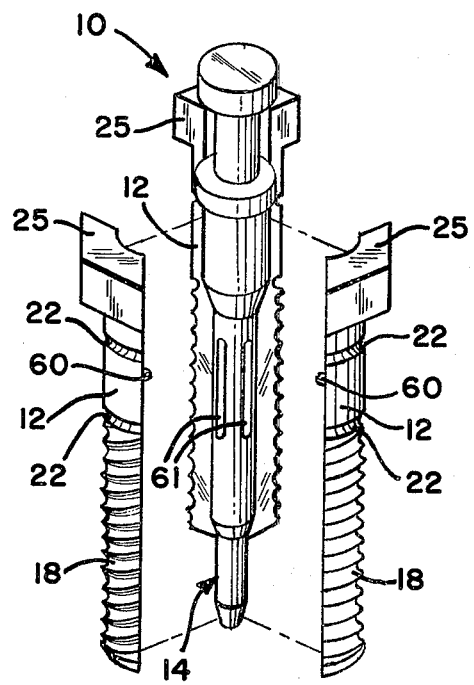
FIG. 2 is an exploded view of the split bolt of FIG. 1.
Figure 3:
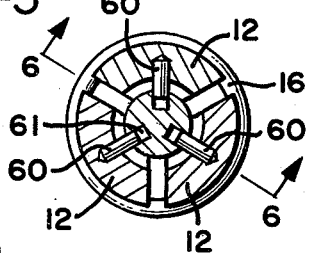
FIG. 3 is a cross-sectional view of the split bolt of the invention, taken along the line 3—3 of FIG. 7.
Figure 4:
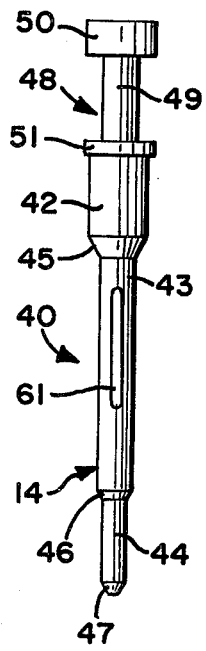
FIG. 4 is an elevational view of one of the wedge member used in the split bolt of the invention.
Figure 5:
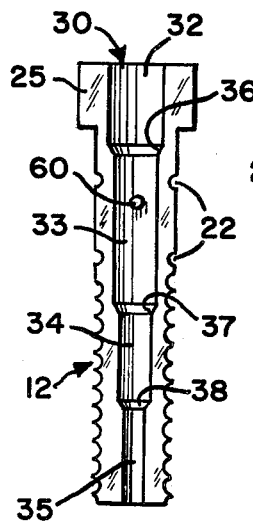
FIG. 5 is an elevational view of one of the segments of the split bolt of the invention.

As shown in FIGs. 1 and 2, the split bolt 10 is basically comprised of three substantially identical bolt segments 12 and wedge member 14. The segments 12 are interconnected by elastic members 16 which surround the bolt segments 12 and hold them in contact with wedge member 14. The insertion of wedge 14 between the segments 12 will cause them, as well as the elastic member 16, to expand radially and to bring threads 18 into engagement with the internal threads in a nut member 20 (FIGS. 6 and 7), which is provided with appropriate support legs and into which the split bolt is inserted when it is in use, e.g., holding in place a lifting ring which is represented (in FIG. 6) by collar 21 (the remainder of the ring being broken away). In its open or expanded state, i.e., when the segments have been spaced apart radially, the split bolt 10 can be threaded into a complementary threaded nut or bore. In the collapsed state, i.e., when the segments 12 are together, the split bolt 10 is readily capable of being inserted into or withdrawn from the same threaded nut or bore because its collapsed diameter is less than its full diameter.

The bolt segments 12 are formed by drilling or boring out the center of an ordinary bolt so that a bolt with a hollow center is formed. Then, the bolt is split, by sawing or the like, into the segments 12. Although three segments are shown and will be discussed, the invention is not limited to three segments, and so two or four or more segments could be used. Grooves 22 are formed in the outer surfaces of the segments to hold the elastic members 16 in place and prevent them from moving up or down the bolt. Although the use of two elastic members is illustrated in FIGS. 1–7, the invention is not so limited, and one (as shown in FIGS. 8–10) or more can be used as desired. Further, the elastic members 16 can comprise any conventional elastic means, although the use of elastic O-rings is preferred.

The top of each bolt segment 12 comprises an enlarged head portion 25. When the bolt segments 12 are viewed overall, they resemble a normal bolt head. As illustrated in FIGS. 1 and 2, head sections 25 define, overall, a hexagonal head.

The segments 12 possess inner surfaces which together define a central bore 30 into which the wedge member 14 is inserted. By drilling out the bore 30 using a step drill, the bore 30 will comprise a series of integral cylindrical sections 32–35 of decreasing diameters. The difference between the diameters of adjacent sections will be approximately the same, i.e., the difference between the diameters of sections 33 and 34 should equal the difference between the diameters of sections 34 and 35. In this way, each camming point will produce the same amount of radial movement and will result in a uniform expansion along the length of the segments.

The cylindrical sections 32–35 have transitional frusto-conical portions or steps 36–38 which are formed with a relatively small angle of taper with receipt to the surface of the cylindrical sections, e.g., an angle in the range of 10°–30°, as compared to the axis of the wedge member. But, there is no criticality in the angle of the steps 36–38 as long as they perform their camming function (to be described in detail hereinafter), and they can be formed in the drilling operation by the step drill.

The wedge member 14 comprises a generally cylindrical body portion 40 comprised of a series of integral cylindrical sections 42–44 of decreasing diameters joined by transitional frusto-conical portions or steps 45 and 46, and having a frusto-conical tip end 47, the steps 45 and 46 and the tip 47 being essentially complementary to the steps 36–38 respectively. The head end portion 48 comprises an entended cylindrical section 49 which terminates in a cylindrical section or boss 50. The head end 48 and body portion 40 are preferably integral and have an integral, cylindrical collar means 51 therebetween.

When wedge member 14 is in use, the boss 50 can be grasped or struck to impart a longitudinal force and motion to the wedge to insert it between the segments 12. Collar means 51 will restrict the travel of wedge member 14 when it is inserted by abutting against the top surface of the bolt section heads 25. This also results in the head end 48 being exposed so that it may be grasped to extract the wedge member 14 when the split bolt 10 is to be collapsed and removed.

Figure 6:
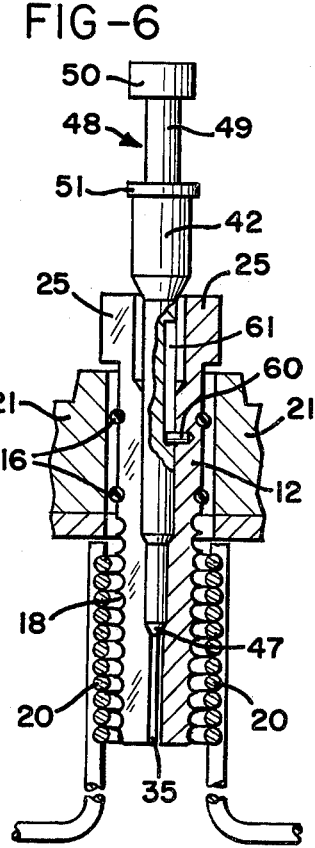
FIG. 6 is a view, partially in cross section along lines 6—6 in FIG. 3 and partially broken away, of a split bolt of the invention when it is collapsed and inserted in a threaded insert.
Figure 7:
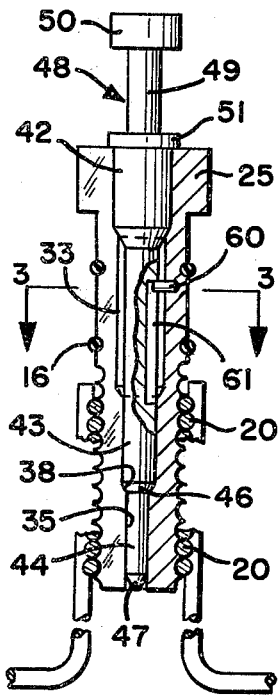
FIG. 7 is a view similar in FIG. 6, except that the split bolt is expanded.

FIGS. 6 and 7 show the operation of the split bolt 10. In its initial or collapsed state, i.e., when the wedge member 14 is inserted in the bore 30 formed by the elastically interconnected bolt segments 12, the wedge step 46 and wedge tip 47 will contact the steps 37 and 38 of the bolt segments 12. When the bolt segments are formed by sawing (for example) a drilled out bolt, enough bolt material is removed from between the segments that they can be brought together radially, i.e., collapsed, and form a bolt having a diameter less than the original bolt size and so can be readily inserted in a coil 20 inserted in concrete as shown in FIG. 6. In the collapsed state, the inside surfaces of cylindrical sections 33 and 34 of bolt segments 12 will be urged by elastic members 16 into contact with the outside surfaces of cylindrical sections 43 and 44 of wedge member 14. Thus in the collapsed state shown in FIG. 6 the split bolt 10 has the wedge member 14 partially inserted and wedge step and tip surfaces 46 and 47 in contact with bolt segment step surfaces 37 and 38.

As wedge member 14 is inserted, e.g., by grasping boss 50 of head end 48 and applying an axial force to the wedge member, the camming surfaces 46 and 47 of the wedge will cam against the camming surfaces 37 and 38 of bolt segments 12 because the surfaces are at an angle. As the surfaces cam against one another, the force of the wedge member 14 being inserted causes the bolt segments 12 to be spaced apart radially and into contact with the nut member 20 (FIG. 7). Also, since the elastic members 16 surround the bolt segments 12, they are forced to expand radially, and, in opposition to the expansion force, keep the bolt segments 12 in surface contact with the wedge member 14. At the same time that camming surfaces 46 and 47 are acting to space the segments 12, surface 45 acts on the bolt head portion 25 of the segment 12. Thus as the wedge member 14 is inserted, there are three points at which the segments 12 are spaced apart by camming action. While the three cammming surfaces are shown, it should be understood that the invention is not limited to three points, and any number of plural points can be employed.

After the segments 12 have been spaced apart, i.e., the bolt 10 has been expanded, the segments 12 will be held apart because wedge sections 42, 44 and 45 will move into line within cylindrical sections 32, 34 and 35 of the bolt segments 12, and hold the segments 12 in the spaced apart relationship wherein their threads engage the complementary threads in nut 20. This expanded state is best shown in FIG. 7. To collapse the split bolt 10, the wedge member is axially extracted by grasping, e.g., boss member 50. The expanded elastic members 16 will return to their original shape and exert a radially inward force on the segments 12 causing them to move together and the bolt 10 to collapse.

In order to limit the travel of wedge member 14 in bore 30, pins 60 can be placed in each of the bolt segments 12, and slots 61 placed in those portions of wedge member 14 which face the bolt segments 12. The length of the slots 61 will determine the amount of travel for wedge member 14. The lowest end of slot 61 (FIG. 6) will be the collapsed state of bolt 10, and the highest end of slot 61 (FIG. 7) will be the expanded state of bolt 10.

FIGS. 8–10 show an alternative embodiment in the form of a modification of the split bolt of FIGS. 1–7. Basically, the differences between the embodiment of FIGS. 1–7 and that of FIGS. 8–10 are that each bolt segment 70 has three cylindrical surface sections 71–73 (as compared to four in FIGS. 1–7) and two camming surfaces 74–75, the location of the pin 77 is different, the length of the slot 78 therefore is longer, and only one elastic member 79 is employed. But the split bolt of FIGS. 8–10 operates in basically the same manner as the split bolt of FIGS. 1–7.

The manufacture of the embodiment of FIGS. 8–10 is somewhat simplified since the bore defined by surfaces 71–73 has only three cylindrical sections. The wedge member 80 has three complementary sections 81–83 and two frusto-conical cam portions 84–85 in addition to its tapered tip 88. Otherwise, the operation of this embodiment is essentially the same as described in connection with FIGS. 1–7.

While the invention has been described in terms of a wedge member and bore of circular sections, it will be appreciated that other geometric shapes could be employed, including octagons, hexagons and triangles, but these will not be as preferable as the cylindrical shape because of the difficulties and expense of machining the non-circular shapes. Also, when the bolt segments are shown as provided with screw threads, that is not essential to the invention, and other configurations of interfitting sections could be used such for example as a series of matching circumferential grooves on both the segments and the insert with which the split bolt assembly is to be used. The term "threaded" is accordingly to be understood including such modification.

While the form of apparatus herein described constitutes a preferred embodiment of the invention, it is to be understood that the invention is not limited to this precise form of apparatus, and that changes may be made therein without departing from the scope of the invention.

What is claimed is:

1. A bolt of the character described, comprising plural bolt segments which when radially brought together render said bolt readily insertable into a complementary threaded recess, which have outer surfaces threadably engageable with such a recess when said segments are radially spaced apart, and which have inner surfaces which in combination form a central bore comprising a series of plural, generally cylindrical sections of uniformly decreasing cross-sectional diameter defining female camming surfaces, and an elongated wedge member insertable between said segments to space said segments radially into such threadable relation, said wedge member having a head end, means limiting insertion of said wedge member to a position wherein said head end thereof extends a predetermined longitudinal distance from the upper ends of said segments, and a body portion of a series of plural generally cylindrical sections defining male camming surfaces between said sections whereby when said wedge member is inserted between said segments, said wedge steps will cam against segment steps causing said segments to be spaced apart radially and uniformly along the length of the segments.

2. A bolt as in claim 1 further including elastic means for interconnecting said segments and maintaining said segments in surface contact with said wedge member.

3. A bolt as in claim 2 wherein said elastic means commprises an elastic O-ring, said outer surfaces have a groove therein, and said O-ring is seated in said groove.

4. A bolt as in claim 3 wherein there are two O-rings and grooves.

5. A bolt as in claim 1 comprising pin members protruding inwardly from said inner surfaces of said segments and received in axial slots in the surface of said wedge member for travel in said slots limiting the axial travel of said wedge member.

6. A bolt as in claim 5 comprising three segments each having a pin protruding therefrom into a complementary slot in said wedge member.

7. A bolt as in claim 1 wherein there are four sections of said bore and three sections of said body.

8. A bolt as in claim 1 wherein said limiting means comprises a generally cylindrical, integral collar located on said wedge member between said body portion and said head end and larger then the bore of said segments, whereby when said wedge member is inserted in said bore between said segments, said collar will limit the extent to which said wedge member can be inserted.

9. In a bolt of the type having plural bolt segments which when radially brought together render the bolt insertable into a complementary threaded recess and which when radially spaced apart engage the outer threaded surfaces of said segments with the threaded recess, and having an elongated wedge member insertable between the segments to space them apart, the improvement comprising plural camming surfaces comprising plural, integral, generally cylindrical sections joined by uniform, transitional sections on said wedge member which engage and cam against corresponding camming surfaces on the inner surfaces of said bolt segments when said wedge member is inserted between said segments to cause said segments to be spaced apart radially and uniformly along the length of the segments.

* * * * *